(No Model.) 2 Sheets—Sheet 1.
S. L. ALLEN.
FURROWING AND COVERING MACHINE.
No. 318,441. Patented May 26, 1885.
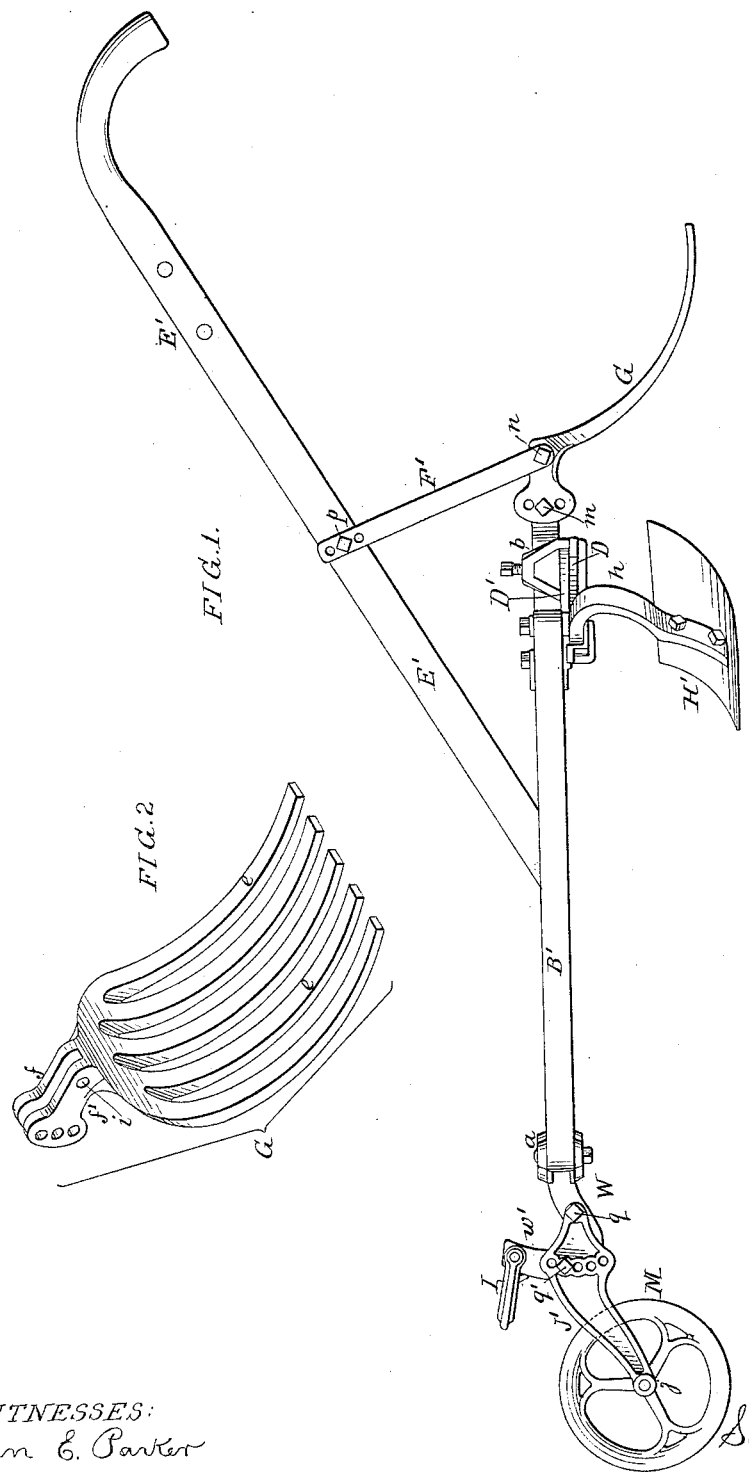

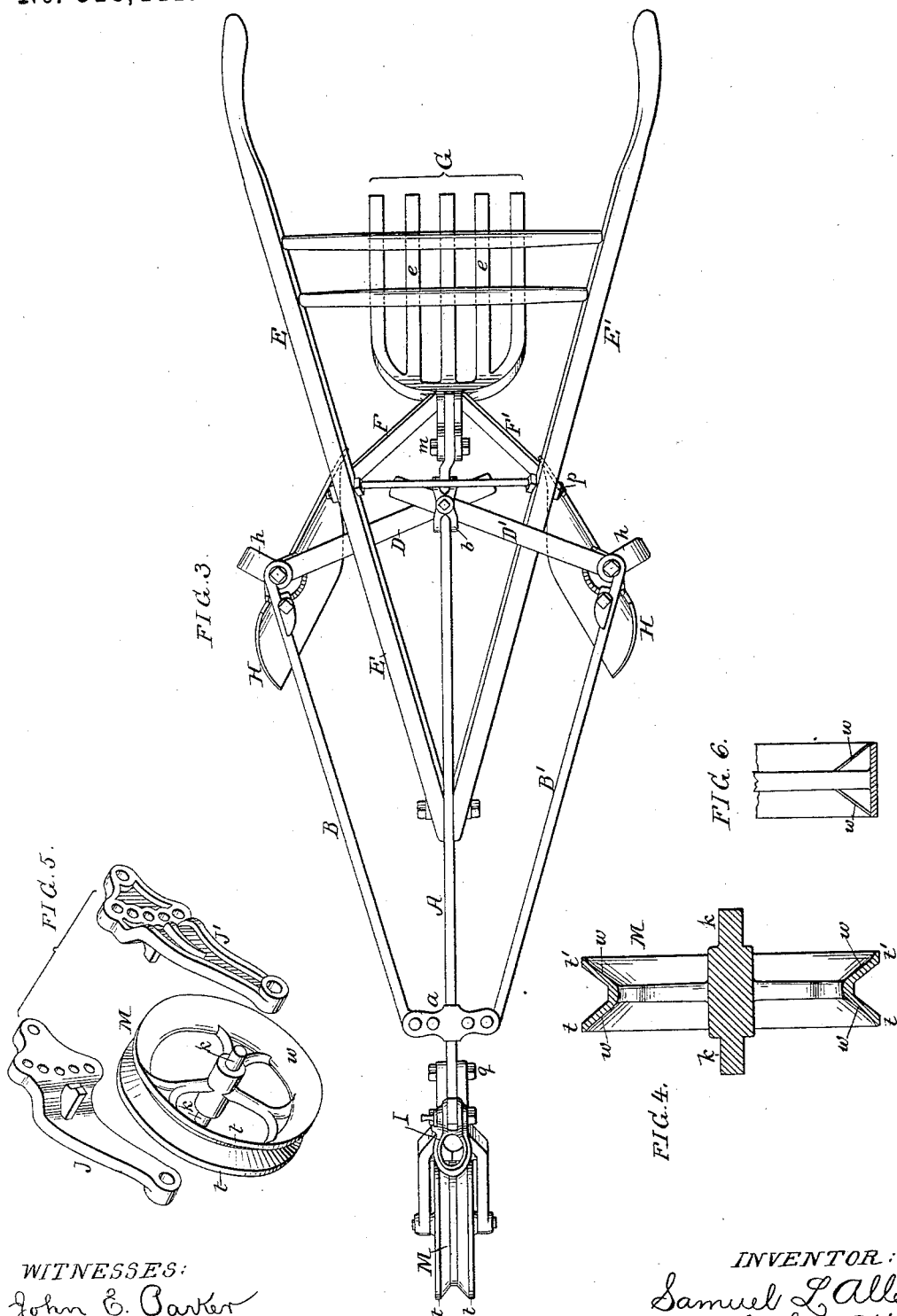

UNITED STATES PATENT OFFICE.

SAMUEL L. ALLEN, OF PHILADELPHIA, PENNSYLVANIA.

FURROWING AND COVERING MACHINE.

SPECIFICATION forming part of Letters Patent No. 318,441, dated May 26, 1885.

Application filed February 4, 1884. (No model.)

*To all whom it may concern:*

Be it known that I, SAMUEL L. ALLEN, a citizen of the United States, and a resident of Philadelphia, Pennsylvania, have invented certain Improvements in Furrowing and Covering Machines, of which the following is a specification.

My invention consists of certain improvements in that class of agricultural implements which are used for turning furrow-slices over corn or other seeds, or over manure, and for pressing down the ridges formed by the furrow-slices; and the objects of my improvements, which are fully described hereinafter, are, first, to press down the ridges formed by the furrows without compacting the surface of the soil, as rollers or scrapers heretofore used compact it; second, to regulate the depth of cut made by the mold-board, and, third, to prevent the displacement by the leading-wheel of the implement of the seeds deposited in furrows prior to covering the same.

In the accompanying drawings, Figure 1, Sheet 1, is a side view of my improved covering-machine; Fig. 2, a perspective view of the leveling device attached to the machine; Fig. 3, Sheet 2, a plan view; Fig. 4, a transverse section of the leading-wheel, and Fig. 5 a perspective view of the leading-wheel and bearing-brackets therefor. Fig. 6 is a sectional detail of the wheel.

A is the central bar of the frame, and to an attachment, $a$, secured to this bar, are hinged the two adjustable angle-bars B B'.

To the rear end of the bar B is hinged a bar, D, and to the rear end of the bar B' a similar bar, D', these bars D D' crossing each other beneath the central bar, and being secured thereto by a clamping device, $b$. As this forms no part of my invention, it will suffice to remark here that the device may be loosened when the bars B B' have to be adjusted, and may be tightened after adjustment. At the point where the bar B is hinged to the bar D is secured a standard, $h$, carrying a mold-board, H, and at the junction of the bar B' with the bar D' is a standard carrying a similar mold-board, both standards being laterally adjustable, so that the mold-board may be moved to any desired angle—an arrangement heretofore adopted in cultivators, in which also may be found the general construction of frame-work described above.

The leveling device G, Fig. 2, which forms a prominent feature of my invention, consists of a series of curved prongs, preferably free at the rear or outer end of the leveler and united at the front end of the same, whence project two arms, $f f'$, between which fit the rear portion of the central bar, A, of the frame, this bar being pivoted to the arms of the leveler by a bolt, $n$, and being further secured thereto by a bolt, $m$, passing through the said central bar and through any one of three or other desired number of holes in the arms $f f'$ of the leveler. Two suitable inclined and connected handles, E E', are secured to the central bar of the frame, one handle being connected by one brace, F, and the other handle by a similar brace, F', to the leveler, preferably by the bolt $n$, which forms the pivot by which the leveler is connected to the central bar, A, of the frame, the upper end of each brace having a number of holes, through any one of which may be passed the bolt $p$ for securing the brace to the handle. While the leveler may be permanently secured to the frame of the machine, it is best to make it adjustable thereon, for reasons explained hereinafter; and it should be here remarked that I do not desire to restrict myself to any specific mode of connecting the pronged leveler to or making it adjustable on the frame, as different ways of doing this will readily suggest themselves to expert mechanics.

To the bent front end, $w'$, of the central bar, A, of the frame are secured the two brackets J J' by bolts $q$ and $q'$, in the outer end of which brackets are the bearings for the journals of the leading-wheel M. I prefer to make these brackets adjustable on the frame, for which reason there are a number of holes in the brackets, the bolt $q'$ being passed through any of these holes, and the bolt $q$ being the pivot of the brackets, the nuts of both bolts being tightened after the adjustment of the said brackets.

The implement is mainly intended for turning furrow-slices over corn which has been planted at the usual hills, the leading-wheel M, as the machine is drawn over the ground, being arranged to traverse the furrow in which the kernels of corn have been deposited at points determined by transverse furrows. The mold-boards turn furrow-slices over the corn, and the leveling device presses down the ridges formed by the two furrow-slices.

Different devices have heretofore been used for performing this duty. A roller at the rear of the mold-boards has been used for this purpose, also a scraper or plain blade; but both of these appliances had a tendency to compact the surface of the soil and render it liable to become caked by the heat of the sun. The pronged leveler, on the other hand, while it serves to depress the soil, cuts and breaks up the clods, and while pressing down the soil more thoroughly over the kernels of corn than a roller or scraper, at the same time leaves the surface of the soil in a somewhat broken condition. The pronged leveler, moreover, is not so liable to become clogged by sticky soil as a roller or scraper. The depth of cut made by the mold-boards may be regulated by the adjustment of the leveler, and the depth of the cut may be more nicely determined by the adjustment both of the leading-wheel and the leveler. It will be observed that the rim of the wheel is grooved, so as to present two inclined flanges, $t\ t'$. It is the internal inclinations, $w\ w$, of the rim, however, which form a prominent feature of my invention; for the rim of the wheel may be straight externally, as shown in Fig. 6, and the internal inclinations may be formed by filling-pieces. The grooved wheel, however, is the most economical. The object of this wheel having a rim inclined internally may be explained as follows: A wheel having an ordinary rim is very apt to displace the kernels of corn which have been deposited at intervals in the furrow, the kernels in some cases gaining access to the interior of the rim of the wheel, and being subsequently carried by the latter beyond the points where they have been deposited. With the improved wheel, however, the case is different, for even if kernels should temporarily gain access to the interior of the rim, they will promptly roll off the inclined interior of the same.

In the above description I have referred to the covering of corn deposited in furrows; but it will be understood that the implement can be used for covering any seeds or for turning furrows over manure and leveling the ridges.

In carrying out the main features of my invention different styles of frame-work may be adopted; but I prefer that illustrated in the drawings described above.

I claim as my invention—

1. The combination, in a covering-machine, of a frame and mold-board carried thereby with the leveler G, secured to the frame and having rearwardly-projecting prongs for bearing on without scraping or raking the soil, substantially as set forth.

2. The combination of the frame and mold-boards of a covering-machine with an adjustable leading-wheel in advance of the said mold-boards and an adjustable pronged leveler at the rear of the same, substantially as described.

3. The combination, with the frame of a cultivator, of the leading-wheel having a rim internally inclined, as set forth.

In testimony whereof I have signed my name to this specification in the presence of two subscribing witnesses.

SAMUEL L. ALLEN.

Witnesses:
JOHN SPARHAWK, Jr.,
JOHN M. CLAYTON.